US011315108B2

(12) United States Patent
Omojola et al.

(10) Patent No.: US 11,315,108 B2
(45) Date of Patent: Apr. 26, 2022

(54) PROFILE GENERATION AND ASSOCIATION WITH MULTIPLE TRANSACTION CARDS CONTEMPORANEOUSLY

(71) Applicant: Block, Inc., San Francisco, CA (US)

(72) Inventors: Ayokunle Omojola, San Francisco, CA (US); Ashutosh Sham Dhodapkar, Fremont, CA (US)

(73) Assignee: Block, Inc., San Francisco, CA (US)

( * ) Notice: Subject to any disclaimer, the term of this patent is extended or adjusted under 35 U.S.C. 154(b) by 0 days.

(21) Appl. No.: 16/206,842

(22) Filed: Nov. 30, 2018

(65) Prior Publication Data

US 2020/0175500 A1 Jun. 4, 2020

(51) Int. Cl.
*G06Q 20/40* (2012.01)
*G06Q 20/34* (2012.01)
*G06K 19/06* (2006.01)
*G06K 19/07* (2006.01)
*G06Q 20/32* (2012.01)
*G06Q 20/42* (2012.01)

(52) U.S. Cl.
CPC ..... *G06Q 20/356* (2013.01); *G06K 19/06028* (2013.01); *G06K 19/06037* (2013.01); *G06K 19/0723* (2013.01); *G06Q 20/3223* (2013.01); *G06Q 20/405* (2013.01); *G06Q 20/40145* (2013.01); *G06Q 20/42* (2013.01)

(58) Field of Classification Search
CPC ........... G06Q 20/356; G06K 19/06028; G06K 19/0723
USPC .......................................................... 705/44
See application file for complete search history.

(56) References Cited

U.S. PATENT DOCUMENTS

| 2,666,655 A | 1/1954 | Wolowitz |
| 3,217,643 A | 11/1965 | Crissy et al. |
| 3,601,913 A | 8/1971 | Pollock et al. |
| 5,221,838 A | 6/1993 | Gutman et al. |

(Continued)

FOREIGN PATENT DOCUMENTS

| WO | 2007/008686 A2 | 1/2007 |
| WO | 2016/033165 A1 | 3/2016 |
| WO | 2018/063809 A1 | 4/2018 |

OTHER PUBLICATIONS

Tokenization of a Physical Debit or Credit Card for Payment An IP.com Prior Art Database Technical Disclosure Authors et. al.: Ritcha Ranjan (Year: 2017).*

(Continued)

*Primary Examiner* — Bruce I Ebersman
*Assistant Examiner* — John A Anderson
(74) *Attorney, Agent, or Firm* — Polsinelli PC—Square

(57) ABSTRACT

A payment service generates multiple user profiles, each profile associated with a different user. Each user profile may be linked to multiple transaction cards and multiple numerical balances. Multiple transaction cards can be linked to a same numerical balance—even if the cards are from different user profiles. Restrictions, such as transaction type blacklists and whitelists or parent/guardian permission relationships, can be placed on particular numerical balances, or on access to particular numerical balances by particular cards. Numerical balances and transactions using particular cards may be tracked using user profiles with access to those cards and numerical balances.

20 Claims, 7 Drawing Sheets

(56) References Cited

U.S. PATENT DOCUMENTS

| | | | |
|---|---|---|---|
| D358,419 S | 5/1995 | Runyan | |
| D387,802 S | 12/1997 | Finkelstein et al. | |
| D406,861 S | 3/1999 | Leedy, Jr. | |
| 5,892,900 A | 4/1999 | Ginter et al. | |
| D438,563 S | 3/2001 | Webb et al. | |
| D462,714 S | 9/2002 | Creighton | |
| 6,601,049 B1 | 7/2003 | Cooper | |
| D486,515 S | 2/2004 | True | |
| D498,788 S | 11/2004 | Lubking | |
| 7,433,499 B2 | 10/2008 | Kim | |
| 7,567,936 B1 | 7/2009 | Peckover et al. | |
| 7,693,745 B1 | 4/2010 | Pomerantz et al. | |
| D620,975 S | 8/2010 | Skelding et al. | |
| D622,315 S | 8/2010 | Skelding et al. | |
| D628,236 S | 11/2010 | Skelding et al. | |
| D635,186 S | 3/2011 | Skelding et al. | |
| D643,062 S | 8/2011 | Skelding et al. | |
| D665,851 S | 8/2012 | Davis | |
| 8,700,905 B2 | 4/2014 | Guenther | |
| D746,866 S | 1/2016 | Memoria et al. | |
| D766,269 S | 9/2016 | Gandhi et al. | |
| D766,308 S | 9/2016 | Park et al. | |
| D766,925 S | 9/2016 | Sanderson et al. | |
| D767,024 S | 9/2016 | O'Shea et al. | |
| D768,770 S | 10/2016 | Lee et al. | |
| D772,259 S | 11/2016 | Pahwa et al. | |
| D782,503 S | 3/2017 | Lee et al. | |
| D782,504 S | 3/2017 | Lee et al. | |
| D786,274 S | 5/2017 | Lee et al. | |
| D794,044 S | 8/2017 | Sung et al. | |
| 9,741,036 B1 | 8/2017 | Grassadonia et al. | |
| D803,882 S | 11/2017 | Martin et al. | |
| D804,510 S | 12/2017 | Federighi et al. | |
| 9,836,736 B1 | 12/2017 | Neale et al. | |
| 9,842,330 B1 | 12/2017 | Van Os et al. | |
| D808,403 S | 1/2018 | Capela et al. | |
| D813,302 S | 3/2018 | Getachew et al. | |
| 9,922,326 B2* | 3/2018 | Alexander, IV | G06Q 20/00 |
| D816,701 S | 5/2018 | Ball et al. | |
| 10,032,325 B1 | 7/2018 | Westen et al. | |
| D835,125 S | 12/2018 | Tople et al. | |
| 10,157,397 B2 | 12/2018 | Walz | |
| D850,469 S | 6/2019 | Malahy et al. | |
| D851,663 S | 6/2019 | Guesnon, Jr. | |
| 10,510,057 B2 | 12/2019 | Priebatsch et al. | |
| D872,098 S | 1/2020 | Chaudhri et al. | |
| D873,850 S | 1/2020 | Mu et al. | |
| D882,600 S | 4/2020 | Lokhtin et al. | |
| D886,135 S | 6/2020 | Cheng et al. | |
| 2002/0046169 A1 | 4/2002 | Keresman, III et al. | |
| 2006/0206425 A1 | 9/2006 | Sharma | |
| 2007/0022303 A1 | 1/2007 | Awatsu et al. | |
| 2007/0119921 A1* | 5/2007 | Hogg | G06Q 40/025 235/380 |
| 2009/0299864 A1 | 12/2009 | Newbrough | |
| 2010/0089998 A1 | 4/2010 | Sandstrom et al. | |
| 2011/0099088 A1 | 4/2011 | Berrios et al. | |
| 2011/0306368 A1 | 12/2011 | McCarthy | |
| 2012/0259768 A1* | 10/2012 | Mukherjee | G06Q 40/02 705/39 |
| 2012/0278189 A1 | 11/2012 | Goldberg et al. | |
| 2012/0296818 A1 | 11/2012 | Nuzzi et al. | |
| 2013/0024361 A1 | 1/2013 | Choudhuri et al. | |
| 2013/0166441 A1 | 6/2013 | Kobylkin et al. | |
| 2013/0254284 A1 | 9/2013 | Dougherty et al. | |
| 2013/0346314 A1 | 12/2013 | Mogollon et al. | |
| 2014/0122988 A1 | 5/2014 | Eigner et al. | |
| 2014/0249947 A1* | 9/2014 | Hicks | G06Q 10/087 705/21 |
| 2015/0019965 A1 | 1/2015 | Roberts et al. | |
| 2015/0134468 A1 | 5/2015 | Dixon et al. | |
| 2015/0170241 A1 | 6/2015 | Jacobsen et al. | |
| 2015/0278801 A1 | 10/2015 | Friedlander | |
| 2015/0371219 A1 | 12/2015 | Ljujic | |
| 2016/0063484 A1 | 3/2016 | Carpenter et al. | |
| 2016/0275486 A1 | 9/2016 | Liu et al. | |
| 2017/0154341 A1 | 6/2017 | Gilbertson | |
| 2017/0372415 A1 | 12/2017 | He | |
| 2018/0096340 A1 | 4/2018 | Omojola et al. | |
| 2018/0150823 A1 | 5/2018 | Omojola et al. | |
| 2018/0300741 A1 | 10/2018 | Leonard et al. | |
| 2019/0034889 A1 | 1/2019 | Brock et al. | |
| 2019/0172055 A1 | 6/2019 | Hale et al. | |
| 2020/0175495 A1 | 6/2020 | Omojola et al. | |

OTHER PUBLICATIONS

Notice of Allowance dated Apr. 7, 2020 for U.S. Appl. No. 16/206,834, filed Nov. 30, 2018.

Final Office Action dated Apr. 9, 2020, for U.S. Appl. No. 15/721,212, of Omojola, A., et al., filed Sep. 29, 2017.

Boora P., "Spending App—Another Exploration," Dribble, published Oct. 5, 2016, Retreived from Internet on Jan. 10, 2020, URL: https://dribble.com/shots/3005605-Spending-App-Another-Exploration, 2016.

Schmitt G., "Horizontal Scrolling Pages," Dribble, published May 15, 2016, Retrieved from Internet on Jan. 10, 2020, URL: https://dribble.com/shots/2716393-Horizontal-Scrolling-Pages#shot-description, 2016.

Peluso A., "8 Strategies for Instagram Growth Hackign: Everything You Need to Know," Websauce, published Sep. 18, 2017, Retrieved from Internet on Jan. 10, 2020, URL: https://www.websaucestudio.com/instagram-growth-hacking-everything-you-need-to-know, 2017.

Ex Parte Quayle Action dated Jan. 10, 2020 for U.S. Appl. No. 15/282,759, filed Sep. 30, 2016.

Non-Final Office Action dated Jan. 17, 2020 for U.S. Appl. No. 29/645,711, filed Apr. 27, 2018.

Advisory Action dated Jan. 23, 2020 for U.S. Appl. No. 29/586,087, filed Nov. 30, 2016.

Advisory Action dated Jan. 23, 2020 for U.S. Appl. No. 29/586,095, filed Nov. 30, 2016.

Final Office Action dated Feb. 10, 2020 for U.S. Appl. No. 16/206,834, filed Nov. 30, 2018.

Notice of Allowance dated Apr. 3, 2020 for U.S. Appl. No. 15/282,759, filed Sep. 30, 2016.

Examiner Requisition for Canadian Design Application No. 184337 dated Oct. 2, 2019.

Non-Final Office Action dated Nov. 27, 2019, for U.S. Appl. No. 15/721,212, of Omojola, A., et al., filed Sep. 29, 2017.

Advisory Action dated Dec. 18, 2019, for U.S. Appl. No. 14/453,551, of Brock, Z., filed Aug. 6, 2014.

Non-Final Office Action dated Sep. 15, 2016, of U.S. Appl. No. 15/199,457, for Grassadonia, B., el al., filed Jun. 30, 2016.

Notice of Allowance dated Apr. 21, 2017, of U.S. Appl. No. 15/199,457, for Grassadonia, B., et al., filed Jun. 30, 2016.

Non-Final Office Action dated Jul. 27, 2017, for U.S. Appl. No. 14/453,551, of Brock, Z., filed Aug. 6, 2014.

Non-Final Office Action dated Sep. 20, 2017, for U.S. Appl. No. 15/679,968, of Grassadonia, B., et al., filed Aug. 17, 2017.

Non-Final Office Action dated Dec. 8, 2017, for U.S. Appl. No. 15/382,132, of Westen, P., et al., filed Dec. 16, 2016.

Notice of Allowance dated Jan. 8, 2018, for U.S. Appl. No. 15/679,968, of Grassadonia, B., et al., filed Aug. 17, 2017.

Final Office Action dated Feb. 9, 2018, for U.S. Appl. No. 14/453,551, of Brock, Z., filed Aug. 6, 2014.

Notice of Allowance dated Mar. 26, 2018, for U.S. Appl. No. 15/382,132, of Westen, P., et al., filed Dec. 16, 2016.

Notice of Allowance dated May 31, 2018, for U.S. Appl. No. 15/679,968, of Grassadonia, B., et al., filed Aug. 17, 2017.

Non Final office Action dated Jun. 15, 2018, for U.S. Appl. No. 15/721,212, of Omojola, A., et al., filed Sep. 29, 2017.

Ex Parte Quale Action dated Sep. 19, 2018, for Design U.S. Appl. No. 29/586,095, of Omojola, A., et al., filed Nov. 30, 2016.

Non-Final Office Action dated Nov. 13, 2018, for U.S. Appl. No. 29/586,087, of Omojola, A., et al., filed Nov. 30, 2016.

Final Office Action dated Nov. 15, 2018, for U.S. Appl. No. 15/721,212, of Omojola, A., et al., filed Sep. 29, 2017.

(56) References Cited

OTHER PUBLICATIONS

Non-Final Office Action dated Feb. 21, 2019, for U.S. Appl. No. 14/453,551 of Brock, Z., filed Aug. 6, 2014.
Non-Final Office Action dated Mar. 7, 2019, for Design U.S. Appl. No. 29/586,095, of Omojola, A., et al., filed Nov. 30, 2016.
Non-Final Office Action dated Mar. 22, 2019, for U.S. Appl. No. 16/206,834, of Omojola, A., et al., filed Nov. 30, 2018.
International Search Report and Written Opinion for International Application No. PCT/US2017/051468, dated Nov. 22, 2017.
Non-Final Office Action dated Jun. 27, 2019, for U.S. Appl. No. 15/282,759, of Omojola, A., et al., filed Sep. 30, 2016.
Final Office Action dated Aug. 22, 2019, for Design U.S. Appl. No. 29/586,087, of Omojola, A., et al., filed Nov. 30, 2016.
Final Office Action dated Aug. 22, 2019, for Design U.S. Appl. No. 29/586,095, of Omojola, A., et al., filed Nov. 30, 2016.
Non-Final Office Action dated Aug. 23, 2019, for U.S. Appl. No. 16/206,834, of Omojola, A., et al., filed Nov. 30, 2018.
Final Office Action dated Sep. 17, 2019, for U.S. Appl. No. 14/453,551, of Brock, Z., filed Aug. 6, 2014.
Non Final Office Action dated Aug. 19, 2020, for U.S. Appl. No. 29/586,095, of Omojola, A et al., filed Nov. 30, 2016.
Notice of Allowance dated Aug. 6, 2020, for U.S. Appl. No. 29/645,711, of Jacoby, Brandon, et al., filed Apr. 27, 2018.
Sieber, Bal., "Insurance iOS App Card Swiping", Dribbble, Mar. 6, 2016, 3 pages.
Office Action received for EP Application No. 17772242.8, dated Jan. 21, 2020.
Examination Report received for Australian Patent Application No. 2017335581, dated Apr. 30, 2020.
Examiner Requisition received for Canadian Patent Application No. 3,037,671, dated May 12, 2020.
Final Office Action dated Jun. 19, 2020 for U.S. Appl. No. 29/645,711, filed Apr. 27, 2018.

\* cited by examiner

PROFILE GENERATION AND ASSOCIATION WITH MULTIPLE TRANSACTION CARDS CONTEMPORANEOUSLY

BACKGROUND

Credit cards and debit cards are often used as payment cards by consumers during transactions with merchants. Merchants read such payment cards using point of sale (POS) terminals during the transaction. Payment cards store payment information on a storage medium located on a surface of the card or within the card, such as a magnetic stripe or a integrated circuit (IC) chip compliant with Europay/Mastercard/Visa (EMV) standards. POS terminals read the payment information from the storage medium of a payment card, typically following insertion of the payment card into a slot of the POS terminal that includes an IC chip reader, or following swiping of the payment card through a slot of the POS terminal that includes a magnetic stripe reader. The payment information stored on a payment card and read by a POS device is typically sent by the POS device to a financial institution, which is able to identify a particular payment account using the payment information, such as a customer's bank account if the payment card is a debit card, or a bank account associated with a credit card institution that the customer is engaged with if the payment card is a credit card. To complete the transaction, funds are drawn from the account and transferred to an account associated with the merchant.

Payments cards such as credit cards and debit cards are types of transaction cards, which may also include cards used for transactions other than payments, such as public transit cards that authorize transit and optionally track transit, identification or entry cards that authorize access to a computer system and/or entry/exit to/from a physical area, and the like. Other types of transaction objects or transaction instruments may exist other than cards, such as badges, key fobs, and the like.

More recently, cardless transaction solutions have become available, in which customers typically use a mobile device, such as a smartphone, as a transaction instrument in place of a transaction card. Cardless transaction solutions can be very convenient for customers, who no longer need to bring transaction cards with them. However, cardless transaction solutions can be difficult for new users to adopt and use, and compatibility is an issue as a large number of POS terminals still do not accept cardless transactions or payment instruments that are not payment cards.

Therefore, it would be useful to integrate benefits enabled by cardless transaction infrastructure enables within the framework of the payment card infrastructure in a manner that is easy and intuitive for customers to adopt and to use.

DETAILED DESCRIPTION

A payment service generates multiple user profiles, each profile associated with a different user. Each user profile may be linked to multiple transaction cards and multiple numerical balances. Multiple transaction cards can be linked to a same numerical balance—even if the cards are from different user profiles. Restrictions, such as transaction type blacklists and whitelists or parent/guardian permission relationships, can be placed on particular numerical balances, or on access to particular numerical balances by particular cards. Numerical balances and transactions using particular cards may be tracked using user profiles with access to those cards and numerical balances.

Examples of the subject matter technology disclosed herein provide a number of technical improvements over the traditional methods, which suffered from technical problems. For example, the processes described herein provide a benefit of increased processing speed and efficiency over traditional methods in generating accounts or profiles and onboarding multiple cards or other payment instruments at least because account or profile info and card balances can be preconfigured before the user's mobile device ever downloads an app associated with the payment service and without the user having to input information or perform any account/profile setup manually. Customization is improved, as different cards can be associated with different user profiles or accounts, different balances, different rules/restrictions/limitations, or combinations thereof, allowing access and use to be tailored for different users and different payment instruments in an automated fashion. Memory management is also improved, as card information, balances, user profile information, rules, restrictions, and limitations are tracked together with account and profile information once an account or profile is created, and are kept together even before the account or profile is created. Furthermore, flexibility and ease of use are improved, as cards may be used immediately before an account or profile is ever created, usage restrictions and rules and limitations associated with a profile or card or balance or a link between any of these may be tweaked on the fly, and purchases made both before and after account creation can be tracked once an account/profile is eventually created. Conventional methods of card onboarding were slower, less organized and efficient as data was more scattered across systems, and less flexible as cards typically could not be used until an account or profile was made.

Figure 1:
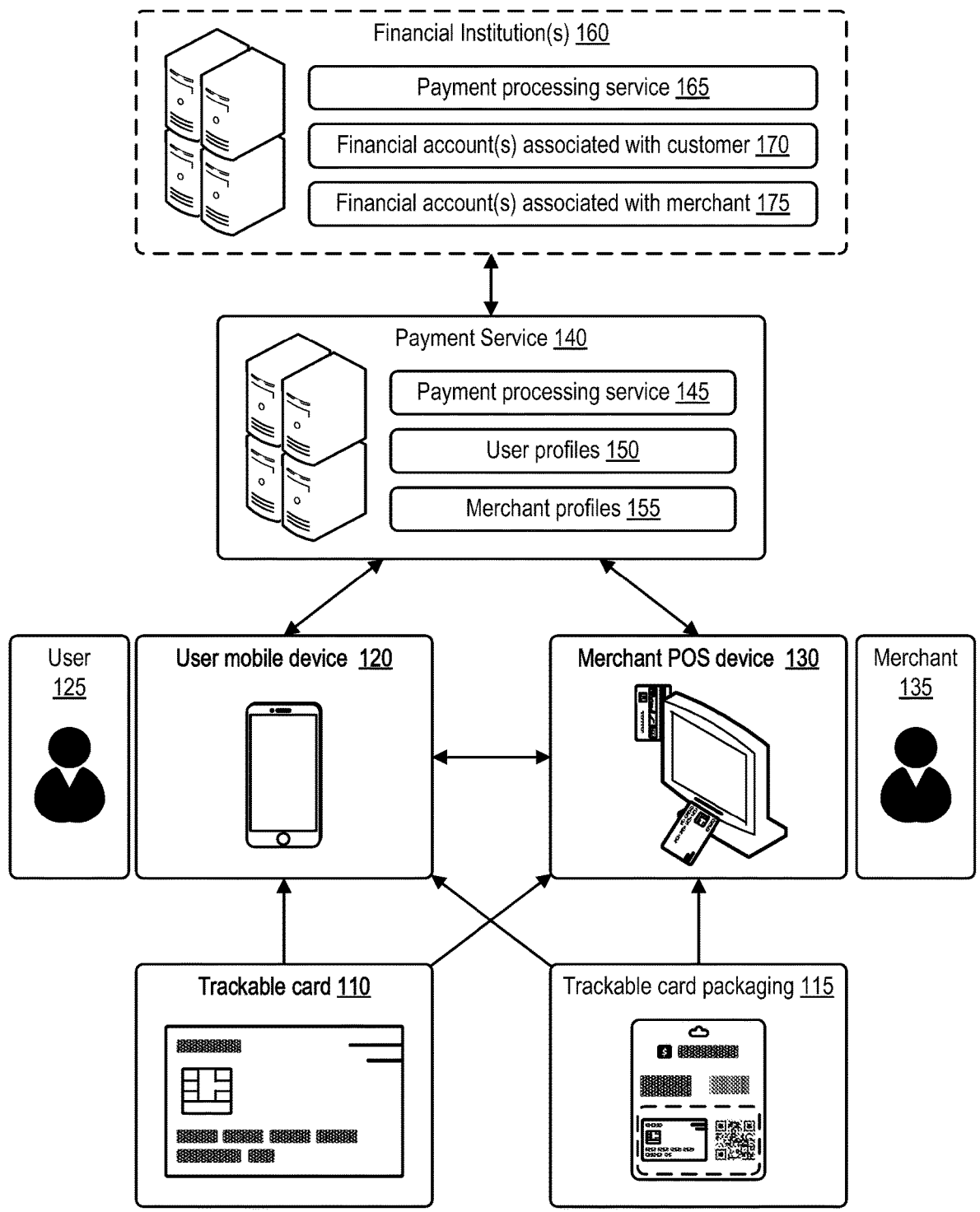
FIG. 1 illustrates a system architecture including a transaction card that is trackable via user profiles of a payment service network.

FIG. 1 illustrates a system architecture including a transaction card that is trackable via user profiles of a payment service network.

Figure 7:
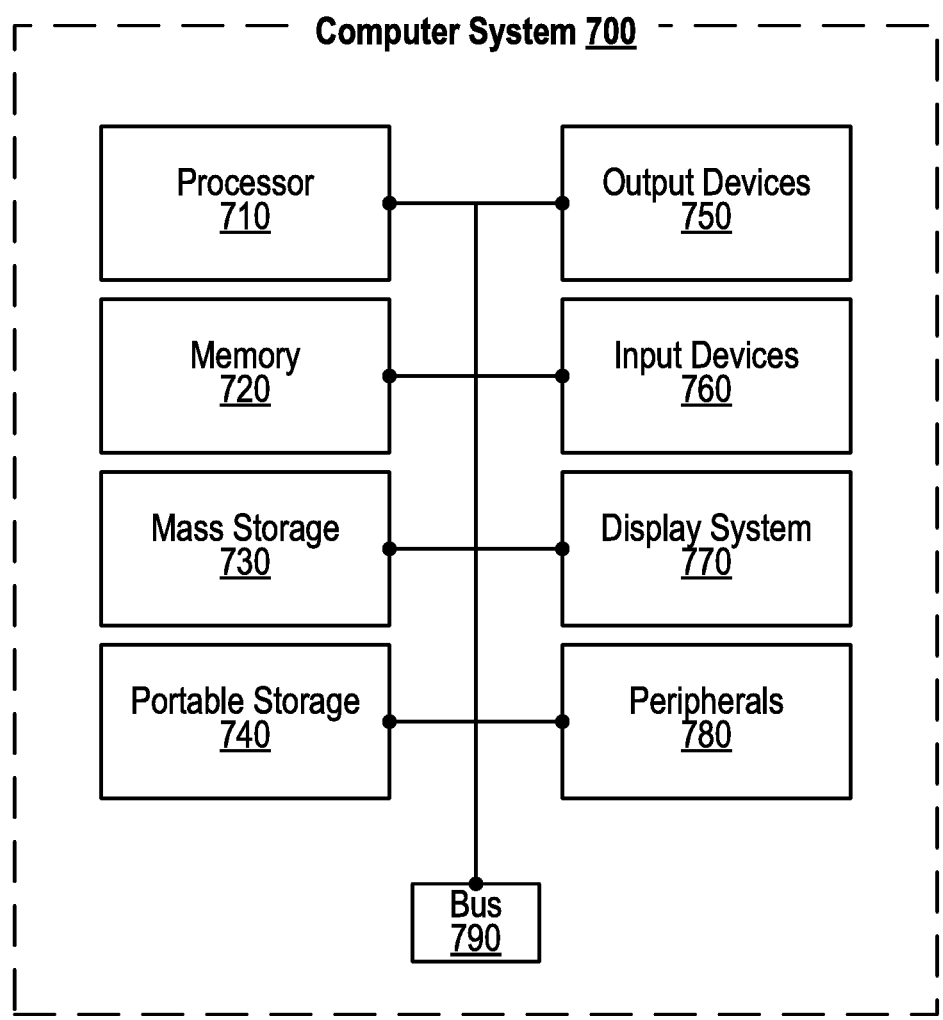
FIG. 7 is a block diagram illustrating components that may be present in computing devices and/or circuitry implementing the present technologies.

The system architecture of FIG. 1 includes a payment service 140 comprising one or more servers, each of which may be computing devices 700 as discussed with respect to FIG. 7, or may include at least a subset of the components identified in FIG. 7. The payment service 140 interacts with a number of other devices, including a customer mobile device 120 belonging to or otherwise associated with a customer 125 and a merchant point of sale (POS) device/terminal 130 belonging to or otherwise associated with a merchant 135.

The system architecture of FIG. 1 also includes a trackable card 110. The trackable card 110 may function as a credit card, as a debit card, as an automated teller machine (ATM) card, as a gift card, or some combination thereof. At least two flows exist through which the user 125 may obtain the trackable card 110.

In a first flow for the user 125 obtaining the transaction card 110, the user 125 creates a user profile 150 with the payment service 140. During this process, the user 125 inputs various user identifying information into a software application associated with the payment service 140, the software application running on the user mobile device 120 of the user 125. The user identifying information may be input into the user mobile device 120 through an interface 525 such as the one illustrated in FIG. 5, and may include, for example, a username and/or email address 550, a password 555, a legal name 560, a date of birth (DOB) 565, a residence and/or mailing address 570, a social security number (SSN) 575 and/or other government-issued identification number/code, or some combination thereof. The user identifying information may also include a signature input through a signature input interface 505 such as the one illustrated in FIG. 5, for example one through which the signature is input via a touch-sensitive surface such as a touchscreen of the user mobile device 120. The payment service 140 can then generate the user profile 150 for the user 125 based on this user identifying information, and may send the transaction card 110 to the user, complete with the signature that the user 125 input already on the card 110. The user 125 may link the profile to a source of funds (e.g., one or more bank accounts, credit union accounts, savings accounts, checking accounts, credit card accounts, debit card accounts, or some combination thereof) and may use that or transfer from that a balance from which the card 110 will pull funds, where the card 110 is then usable in a manner similar to a credit card, debit card, ATM card, or a combination thereof.

In a second flow for the user 125 obtaining the transaction card 110, the user 125 may purchase the transaction card 110 in packaging 115 from a merchant 135 via a merchant POS device 130. The transaction in which the trackable card 110 is purchased is processed by/using the merchant POS device 130 and optionally using the payment processing service 145 of the payment service 140 and/or the payment processing service 165 of the financial institution(s) 160 in order to transfer funds from one or more financial accounts 170 associated with the customer 125 to one or more financial accounts 175 associated with the merchant 135. The financial institution(s) 160 may be banks, credit unions, credit card institutions, debit card institutions, lenders, or combinations thereof. The one or more financial accounts 170 associated with the customer 125 may be bank accounts, credit union accounts, savings accounts, checking accounts, credit card accounts, debit card accounts, or some combination thereof. Alternately, the customer 125 may purchase the transaction card 110 from the merchant using cash that whose receipt is confirmed by the merchant 135 using the merchant POS device 130.

The trackable card 110 may be packaged within a packaging 115 for the trackable card. That is, the card 110 may be at least partially enclosed by, or at least partially covered by, at least partially affixed to, at least partially attached to, at least partially coupled to, at least partially connected to, and/or at least partially adhered to the packaging 115. The trackable card packaging 115 is illustrated in and described further with respect to FIG. 2A-2D, FIG. 3A, and FIG. 3B.

In the second flow for the user 125 obtaining the transaction card 110, the card 110 and/or packaging 115 may include one or more card identifiers, which can be read or scanned by the merchant POS device 130 and/or by the user mobile device 120 and conveyed to the payment service 140 for storage and association with a user profile 150. At least one of the one or more card identifiers may be encoded in optical glyphs, such as barcodes or quick response (QR) codes, which the POS device 130 and/or by the user mobile device 120 can read and/or decode. At least one of the one or more card identifiers may alternately or additionally be encoded in short-range wireless communication circuitry on or within the card 110 and/or the packaging 115, such as a passive or active near field communication (NFC) or radio frequency identification (RFID) tag. At least one of the one or more card identifiers may be simply written out on the card 110 and/or packaging 115, such as a card number, card security identifier, card expiration date, card verification value (CVV), card verification code (CVC), or some combination thereof, on a front and/or back of the card 110 and/or packaging 115. Such card identifiers can be input manually via physical or touchscreen keyboard/keypad of the merchant POS device 130 and/or of the user mobile device 120, or can be scanned/read via a camera of the merchant POS device 130 and/or of the user mobile device 120 and then interpreted via optical character recognition (OCR) algorithms of the merchant POS device 130 and/or of the user mobile device 120.

In one exemplary transaction, the user 125 requests to purchase a card 110 in its packaging 115 from the merchant 135. The merchant 135 then uses the merchant POS device 130 to scan a barcode on the packaging 115, which informs the merchant POS device 130 of a first card identifier. The merchant POS device 130 then sends this first card identifier to the payment service 140 along with a numerical balance of the card 110, which is at least part of the amount paid by the user 125 during the transaction (which optionally might also include fees that go to the merchant 135, to the payment service 140, and/or to one or more financial institutions 160). The payment service 140 stores the card identifier and the numerical balance, either in a user profile 150 if the purchasing user 125 already has one, or in a placeholder data structure that may or may not have any information about the user 125 depending on whether the merchant POS device 130 provided any information about the user 125 to the payment service 140. The user 125 may then use the card 110. If the user 125 wishes to track the balance of the card 110 and/or to track transactions made using the card 110, the user 125 can use the mobile device 120 to read/scan/receive a second card identifier from the card 110 and/or packaging 115, such as NFC tag of the card 110 where the packaging 115 includes electromagnetic shielding (e.g., RF shielding) that prevents reading of the second card identifier while the card 110 is still stored in the packaging 115. The user mobile device 120 then sends the second card identifier to the payment service 140, which can then verify that the user 125 is in possession of the card 110 based on this and by identifying that the first card identifier corresponds to the second card identifier, and can add the card 110 to the user profile 150 of the user 125, and as a result, provide the mobile device 120 with balance information and track transactions. These card identifiers may have been unique and identifiably linked during or prior to manufacturing of the card 110 and/or packaging 115, for example, so that the payment service 140 knows ahead of time and immediately upon receipt of the either card identifier that the first card identifier and second card identifier correspond to the same card 110. The user 125 can also input additional user specific information, such as the user specific information of interface 520 of FIG. 5, through the mobile device 120 to become part of the user profile 150. One or both of the first card identifier and the second card identifier can be referred to simply as "the card identifier"—such as when the first card identifier and the second card identifier are the same identifier.

Each user profile 150 of each different user 125 of the payment service 140 may eventually be tied or linked to multiple cards 110 and/or multiple numerical balances, which may have been added using the first flow discussed above, the second flow discussed above, or a combination thereof. As discussed further herein, multiple cards from the same user 125 or different users 125 may be tied to a single numerical balance, such as when multiple members of a family draw from a shared account. At the same time, a single card 110 can also be tied to multiple numerical balances, which can be drawn from in different situations according to rules managed by the payment service 140 and optionally selected by the user 125 via the mobile device 120, such as when a user 125 wishes to use gift card balances at stores/merchants 135 where the user 125 has gift cards, but a balance of more regular monetary funds otherwise.

Figure 5:
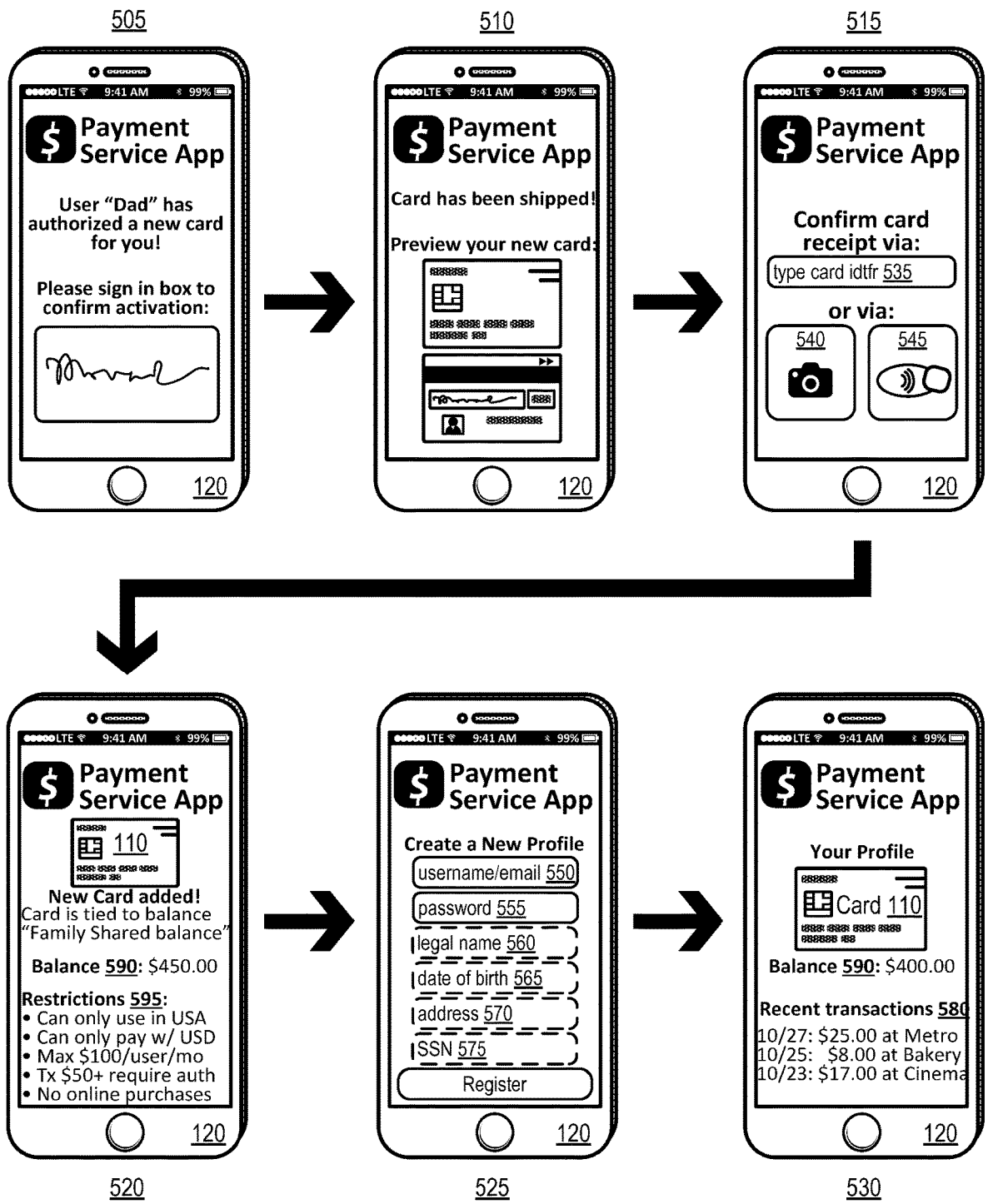
FIG. 5 is a flow diagram illustrating a number of user interfaces of a consumer mobile device at different stages of onboarding a new card and generating a profile tied to the new card.

The trackable card 110 is trackable by the customer via a software application running on the customer mobile device 120 and/or via a website viewable through the customer mobile device 120 as in interface 530 of FIG. 5. The payment service 140, as underwriting entity for the transaction card 110, receives notifications from merchant POS device 130 and/or financial institution(s) 160 whenever the transaction card 110 is used in a transaction. The payment service 140 interprets this transaction information, which often uses difficult-to-understand codes, into plain English, optionally converts currencies as appropriate, optionally formats the transactions into an easy-to-read format, and presents this interpreted and/or converted and/or formatted transaction information to the customer 125 via the mobile device 120 via the software application or website as in interface 530 of FIG. 5. In the same way, the payment service 140 may track the numerical balance remaining associated with the transaction card 110, and may update the numerical balance in real-time as it is modified following transactions made using the transaction card 110.

The user 125 in FIG. 1 may also be referred to as the customer 125 or consumer 125 or a member 125 of the payment service 140. Similarly, the user mobile device 120 may be referred to as the customer mobile device 120 or consumer mobile device 120 or member mobile device 120, and the user profile(s) 150 may be referred to as customer profile(s) 150 or consumer profile(s) 150 or member profile(s) 150.

Figure 2:
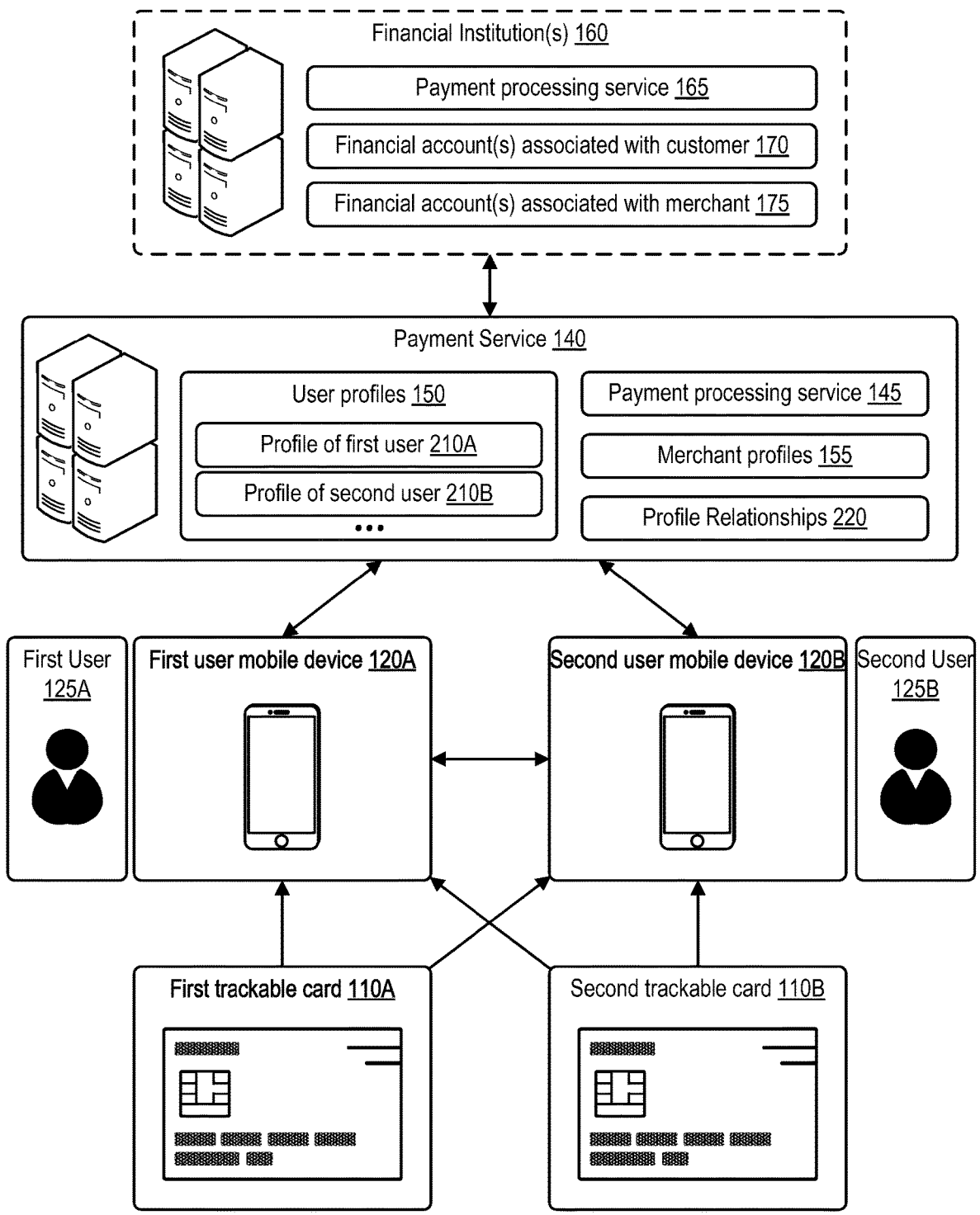
FIG. 2 illustrates a system architecture including multiple users, multiple transaction cards, and multiple user profiles at the payment service network.

FIG. 2 illustrates a system architecture including multiple users, multiple transaction cards, and multiple user profiles at the payment service network.

In particular, the system architecture of FIG. 2 includes a first user 125A with a first user mobile device 120A and a first trackable card 110A and a first user profile 210A of the user profiles 150. The system architecture of FIG. 2 also includes a second user 125B with a second user mobile device 120B and a second trackable card 110B and a second user profile 210B of the user profiles 150. The first user 125A and/or second user 125B may obtain the first trackable card 110A and/or the second trackable card 110B via the first flow discussed above with respect to FIG. 1, via the second flow discussed above with respect to FIG. 1, or some combination thereof. More users 125, user profiles 210, and trackable card 110 may be present.

The payment service 140 also stores information about profile relationships 220 such as profiles that are authorized to use the same balance 310, profiles with parent/guardian permission-required relationships 320, and joint profiles in which a single profile represents multiple users 330. A relationship 220 between the first user profile 210A and the second user profile 210B may be established by the first user 125A using a software application associated with the payment service 140 that is running on the first user mobile device 120A and communicating the profile relationship 220 to the payment service 140 for storage in the user profiles 210A/210B or in a database or other data structure. A relationship 220 between the first user profile 210A and the second user profile 210B may be established by the second user 125B using the software application associated with the payment service 140 that is running on the second user mobile device 120B and communicating the profile relationship 220 to the payment service 140 for storage in the user profiles 210A/210B or in a database or other data structure. Such a software application associated with the payment service 140 is illustrated in FIG. 5.

Figure 4:
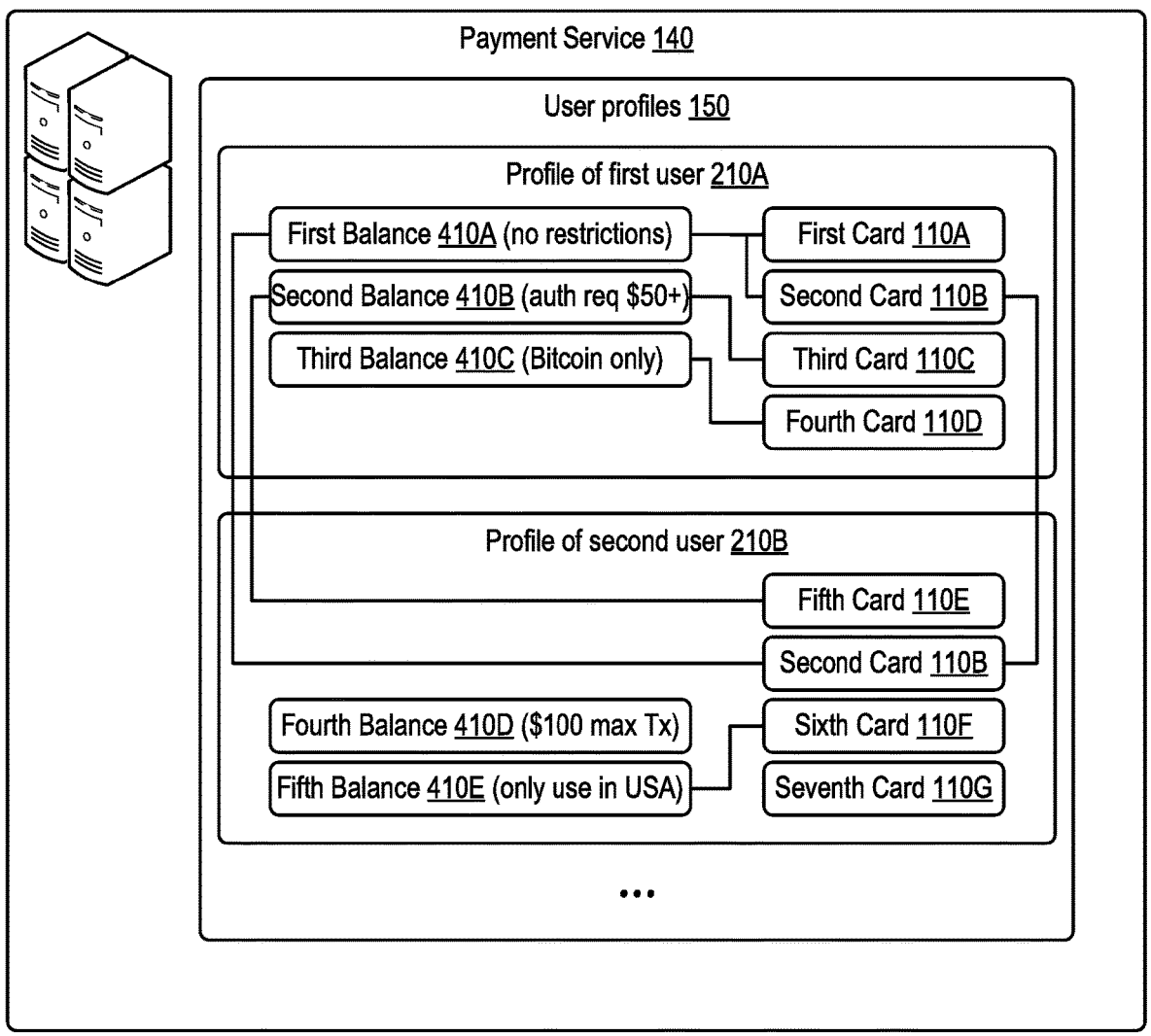
FIG. 4 illustrates a set of user profiles as stored at the payment service network, each user profile corresponding to various cards, balances, relationships, and restrictions.

Certain user profiles 210, cards 110, numerical balances, and links between any of these elements may come with certain restrictions or limitations, such as the ones illustrated in and discussed further with respect to FIG. 4. These limitations, too, may be stored at the payment service 140, either with the user profiles 150 (e.g., as part of individual user profiles 210), with profile relationships 220, or combinations thereof. These limitations, like the relationships 220, may be established by users 125 using the software application associated with the payment service 140 that is running on the user's mobile device 120 and communicating the profile relationship 220 to the payment service 140 for storage in the user profiles 150 or in a database or other data structure.

Figure 3:
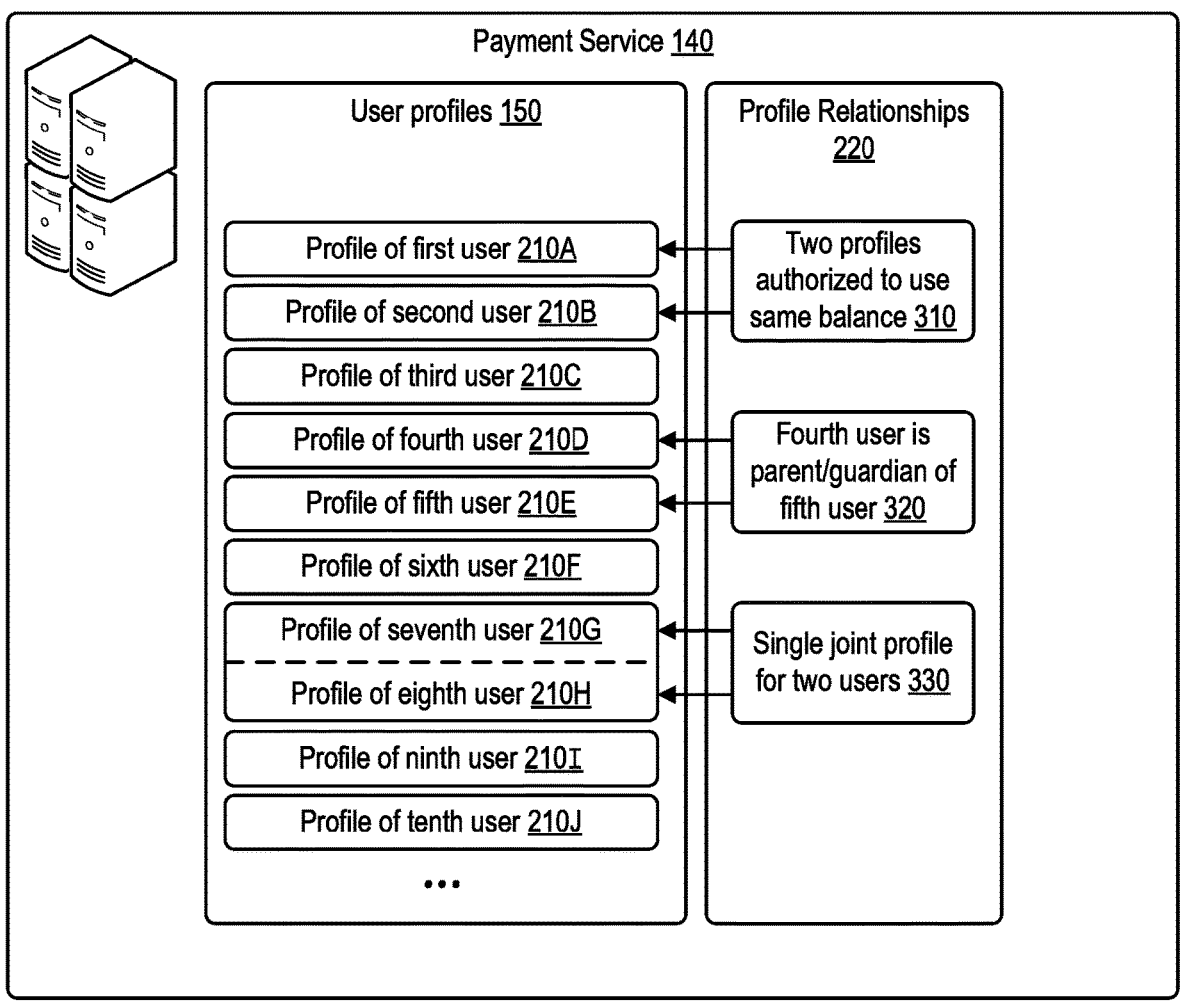
FIG. 3 illustrates a set of user profiles and a set of relationships between the different user profiles as stored at the payment service network.

FIG. 3 illustrates a set of user profiles and a set of relationships between the different user profiles as stored at the payment service network.

The payment service 140 stores a number of user profiles 150, which in FIG. 3 include at least a profile of a first user 210A, a profile of a second user 210B, a profile of a third user 210C, a profile of a fourth user 210D, a profile of a fifth user 210E, a profile of a sixth user 210F, a joint profile of a seventh user 210G and an eighth user 210H, a profile of a ninth user 210I, and a profile of a tenth user 210J. Other payment services 140 may generate and store user profiles 150 for more or fewer than ten users.

The payment service 140 stores information about three types of profile relationships 220. The profile relationships 220 include a balance sharing authorization relationship 310 specifying that the profile of the first user 210A and the profile of the second user 210B have a numerical balance (i.e., a source of funds) that the users corresponding to these two profiles are authorized to share. This may indicate that specific cards 110 used by these users are authorized to access the shared numerical balance, or that all cards used by these users are authorized to access the shared numerical balance, or that cardless transactions made using the profiles (without the cards 110) are authorized to access the shared numerical balance, or combinations thereof. Authorization to access a numerical balance as in the relationship 310 of FIG. 3 may in some cases be contingent on certain restrictions, such as those illustrated in and discussed with respect to FIG. 4.

The profile relationships 220 include a parent/child or guardian/child relationship 320 specifying that the profile of fourth user 210D represents a parent or guardian to the profile of fifth user 210E. A parent/child or guardian/child relationship 320 may indicate that all transactions by the "child" user profile (in this case fifth user profile 210E), or all transactions of one or more specified transaction types of by the "child" user profile (in this case fifth user profile 210E), or all transactions other than those of one or more specified types of transactions by the "child" user profile (in this case fifth user profile 210E), require permission from the "parent/guardian" user profile (in this case fourth user profile 210D).

The one or more specified transaction types may concern what currency is used—e.g., United States dollars (USD), Canadian dollars (CAD), Euros (EUR), Japanese Yen (JPY), United Kingdom Pound Sterling (GBP), Australian dollar (AUD), other specific government-issued currencies, government-issued currencies generally, Bitcoin, Ethereum, Litecoin, Ripple, other specific cryptocurrencies, cryptocurrencies generally, alternative currencies other than government-issued currencies generally, or combinations thereof. The one or more specified transaction types a location or region in which the transaction took place—e.g., expressed as one or more continents, countries, counties, cities, zip codes, area codes, areas of a GNSS coordinate grid, or combinations thereof. The one or more specified transaction types may concern what is purchased or paid for—e.g., food, beverages, clothing, technology, furniture, healthcare, entertainment, vehicles, transit, fuel, electricity, utilities, rent, mortgage/loan payments, or combinations thereof. The one or more specified transaction types may concern what merchant is on the selling end of the transaction—e.g., a supermarket, a grocery store, a café, a restaurant, a movie theater, a live performance theatre, a music venue, an entertainment venue, a sports venue, a school, a university, a warehouse store, a clothing store, a technology store, a furniture store, a hospital, a medical clinic, a pharmacy, a bank, or some combination thereof. The one or more specified transaction types may concern whether the transaction was an online transaction made over the Internet or a transaction made at a merchant's storefront or other merchant area/location through a merchant POS device. The one or more specified transaction types may concern a any combination of the transaction types discussed above or otherwise illustrated or discussed herein.

In the relationship 320, then, when a "child" user 125E uses a card 110E linked to the "child" user profile 210E for a transaction, then, the payment service 140 may then send a request for permission from the user device 120D associated with the "parent/guardian" user profile 210D and permit or prohibit the transaction from going through, for example by prohibiting the card 110E from drawing from a shared balance if a shared balance relationship 310 also exists between the "child" user profile 210E and the "parent/guardian" user profile 210E. For example, transactions by the "child" user profile 210E may require permission from the "parent/guardian" user profile 210E if the transaction takes place outside of the United States, for any transaction not in USD, for any online transaction, for any transaction other than for food or healthcare, and for any transaction other than at a grocery store or hospital.

The profile relationships 220 include a joint profile relationship 330 specifying that the profile of the seventh user 210G and the profile of the eighth user 210H are actually a single user profile. That is, a single joint profile represents both a seventh user 125G and an eighth user 125H. Both users can use cards 110 and/or balances that the single join user profile has access to.

FIG. 4 illustrates a set of user profiles as stored at the payment service network, each user profile corresponding to various cards, balances, relationships, and restrictions.

In particular, the user profiles 150 of the payment service 140 of FIG. 4 include at least a profile of a first user 210A and a profile of a second user 210B. The profile of a first user 210A is linked to a first balance 410A with no usage restrictions, a second balance 410B with a restriction stipulating that authorization by the first user is required for transactions valued greater than or equal to fifty dollars, and a third balance 410C with a restriction stipulating that only transactions in the Bitcoin cryptocurrency are permitted when using the third balance 410C.

The profile of a first user 210A is also linked to four trackable transaction cards 110, including a first card 110A and a second card 110B that are both linked to the first balance 410A, a third card 110C that is linked to the second balance 410B, and a fourth card 110D that is linked to the third balance 410C.

The profile of a second user 210B is linked to a fourth balance 410D with a restriction stipulating a maximum transaction value of one hundred dollars (where transactions exceeding the predetermined transaction amount of $100 are prohibited) and a fifth balance 410E with a restriction stipulating that transactions are only permitted in the United States.

The profile of a second user 210B is also linked to four trackable transaction cards 110. The four trackable transaction cards 110 linked to the profile of a second user 210B include the same second card 110B that the profile of a first user 210A is also linked to that therefore still draws from the first balance 410A; that is, the second card 110B is a joint card 110 that is usable by both the first user and the second user, in a relationship similar to the shared balance relationship 310 and joint profile relationship 330 of FIG. 3. The four trackable transaction cards 110 linked to the profile of a second user 210B also include a fifth card 110E that is linked to the second balance 410B and therefore requires the first user's permission for transactions valued fifty dollars and up—a relationship similar to the parent/child or guardian/child relationship 320 of FIG. 3. The four trackable transaction cards 110 linked to the profile of a second user 210B also include a sixth card 110F that is linked to the fifth balance 410E and therefore can only be used for transactions in the USA. The four trackable transaction cards 110 linked to the profile of a second user 210B also include a seventh card 110G that is not currently linked to any balance and is therefore not currently usable. Likewise, the fourth balance 410D of to the profile of a second user 210B is not linked to any transaction card 110 identified in FIG. 4, and should therefore remain without any withdrawals due to any card transactions processed through the payment service 140.

FIG. 5 is a flow diagram illustrating a number of user interfaces of a consumer mobile device at different stages of onboarding a new card and generating a profile tied to the new card.

The user interfaces 505, 510, 515, 520, 525, and 530 are user interfaces of a software application associated with the payment service 140 that is running on a user mobile device 120 of a user 125, and detail a process for generation of a user profile 210 within the user profiles 150 of the payment service 140 and linking of the user profile 210 to a new transaction card 110. The user interfaces 510, 515, 520, 525, and 530 may alternately be user interfaces of a website associated with the payment service 140 and optionally hosted by the payment service 140. Either way, the user interfaces 510, 515, 520, 525, and 530 may be generated, hosted, and/or served/sent/transmitted by the payment service 140 to the mobile device 120.

The first user interface 505 of FIG. 5 is an authorization input interface that notifies a user 125 that a new transaction card 110 has been authorized for the user 125, and requesting input of a signature from the user 125 as authorization. The signature may be input via touchscreen of the mobile device 120 in the interface 505, or may be input via a touch-sensitive surface separate from the screen (or any other input device 760). The interface 505 may alternately or additionally request a different form of authorization, such as a biometric input (e.g., fingerprint scanned via fingerprint scanner, voiceprint scanned via microphone, face or eye or iris scanned via camera or other optical scanner).

The second user interface 510 notifies the user 125 that the transaction card 110 has been created and shipped to the user 125, and includes a preview of the front surface and rear surface of the card 110, with the rear surface of the card 110 including the signature input via the first user interface 505. The signature may alternately or additionally be on the front surface of the card 110, or may not appear on the card 110 at all.

The third user interface 515 is one through which the user 125 confirms that the card 110 was delivered to the user 125 and is now in the user 125's possession by inputting one or more card identifiers associated with the card 110 or packaging 115 of the card into the mobile device 120. The one or more card identifiers may be received by the mobile device 120 via input through a text/number/character/string input field 535, via a camera or other optical scanner of the mobile device 120 by pressing a camera/optical button 540, via short-range wireless communications such as NFC by pressing a short-range wireless communications button 545, or some combination thereof.

As discussed with respect to FIG. 1, at least one of the one or more card identifiers may be encoded in optical glyphs, such as barcodes or quick response (QR) codes, which the POS device 130 and/or by the user mobile device 120 can read and/or decode. At least one of the one or more card identifiers may alternately or additionally be encoded in short-range wireless communication circuitry on or within the card 110 and/or the packaging 115, such as a passive or active near field communication (NFC) or radio frequency identification (RFID) tag. At least one of the one or more card identifiers may be simply written out on the card 110 and/or packaging 115, such as a card number, card security identifier, card expiration date, card verification value (CVV), card verification code (CVC), or some combination thereof, on a front and/or back of the card 110 and/or packaging 115. Such card identifiers can be input manually via physical or touchscreen keyboard/keypad of the merchant POS device 130 and/or of the user mobile device 120, or can be scanned/read via a camera of the merchant POS device 130 and/or of the user mobile device 120 and then interpreted via optical character recognition (OCR) algorithms of the merchant POS device 130 and/or of the user mobile device 120.

Card identifiers may optionally include encrypted data, or may be encrypted by the mobile device 120 using an encryption key stored at the mobile device 120. The payment service 140 then decrypts these using the corresponding decryption key. The encryption key and decryption key may be symmetric or asymmetric, and either or both may be capable of both encrypting and decrypting content, with "encryption" and "decryption" here only used for ease of discussion with regard to this particular use.

The fourth user interface 520 is an interface indicating that the new card 110 has been linked to the user's user profile 210 with the payment service 140 if the user has an existing user profile 210 with the payment service 140 or added to a tentative/temporary profile or data structure that will become integrated with or at least part of the user profile 210 when the user profile 210 is created. The fourth user interface 520 indicates that the card 110 is linked to a numerical balance 590 referred to as the "family shared balance," which has $450.00, and which, based on the name, suggests a balance shared between multiple users/profiles/cards like the first balance 410A of FIG. 4.

A number of restrictions 595 are placed on the link between the card 110 and the balance 590—that is, the restrictions 590 are rules identifying which transactions using the card 110 are permitted to withdraw funds from the balance 590. The restrictions 595 may apply only to this card 110, or might apply to all cards 110 linked to the balance 590, or may apply to a subset of cards 110 linked to the balance 590. The restrictions 595 identify that the card 110 can withdraw funds from the balance 590 under certain conditions: only transactions taking place in the USA are permitted, only transactions paid using US dollars are permitted, a maximum spending amount of $100 per user per month is placed on the balance 590, individual transactions $50 and up require authorization (e.g., from a parent or guardian or other "primary" profile or account holder), and online transactions are not permitted.

The fifth user interface 525 is an interface through which the user 125 inputs additional user identifying information that the payment service 140 can then use in the generation of a user profile 150 for the user 125. This information may include a username and/or email address 550, a password 555, a legal name 560, a date of birth (DOB) 565, a residence or mailing address 570, a social security number (SSN) 575 or other government-issued identification number/code, or some combination thereof. In some cases, some of this information may not be required—in some cases, for example, only a username and/or email address 550 and a password 555 are required. This user identifying information may be necessary to generate a user profile 210 with the payment service 140 if the user 125 does not already have a user profile 210 with the payment service 140, or to supplement an existing user profile 210 with the payment service 140 if this information has not already been provided.

Certain information, such as the user 125's legal name 560, a date of birth (DOB) 565, a residence or mailing address 570, a social security number (SSN) 575 or other government-issued identification number/code may be required by financial institution(s) 160 government entities in order for the user 125 to be able to perform certain tasks, and therefore might for example only be required if and when the customer 125 makes a purchase or other transaction using the transaction card 110, or when a value of such a purchase or transaction using the transaction 110 exceeds a predetermined value or percentage/fraction of the balance 590, or when the user 125 attempts to use the card 110 for a transaction for a purchase amount that exceeds the remaining balance 590 and therefore requires credit (e.g., a loan) for the remainder, when the customer 125 attempts to transfer funds (e.g., via wire transfer or check) from an account associated with the transaction card 110 to a different financial account, or when the balance 590 exceeds a predetermined amount, such as a maximum amount that is covered by the Federal Deposit Insurance Corporation (FDIC).

The sixth user interface 530 is an interface through which the user 125 may track the balance 590 of the card 110, which has decreased from $450.00 in interface 520 to $400.00 in interface 530. Interface 530 also lists recent transactions 580 made using the card 110, including $25.00 spent at Metro public transit on October 27, $8.00 spent at Bakery on October 25, and $13.00 spent at Cinema on October 23. These recent transactions 580 add up to $50.00 in expenditures, which account for the decrease of the balance 590 from $450.00 to $400.00 between the time at which interface 520 is displayed and the time at which interface 530 is displayed.

While FIG. 5 only displays a single card 110, it should be understood that the processes described herein may be used to link multiple cards 110 to a single user profile 150 of the user 125. Each card of these multiple cards 110 may have a separate balance 590, or multiple cards 110 may draw from the same balance 590. Each card 110 and its balance 590 and transactions 580 may be tracked via the interface 530.

second card identifier 235 may be conveyed to the mobile device 120 by the user 125 typing the second card identifier 235 (or some portion thereof) into an input field 535 through a physical keyboard/keypad, virtual touchscreen keyboard/keypad, or other input device 860. The interface 515 also allows the user 125 to trigger initiation of a camera or other optical sensor of the mobile device 120 via button 540 to visually scan an optical glyph 210/230 and/or at least one surface of the card 110 as discussed with respect to FIGS. 3A-3C and thereby read the second card identifier 235 (or some portion thereof) encoded or simply written therein. The interface 515 also allows the user 125 to trigger initiation of NFC circuitry of mobile device 120 via button 545 to thereby allow the mobile device 120 to receive the second card identifier 235 (or some portion thereof) from NFC circuitry of the card 110 and/or from NFC circuitry of the packaging 115.

Figure 6:
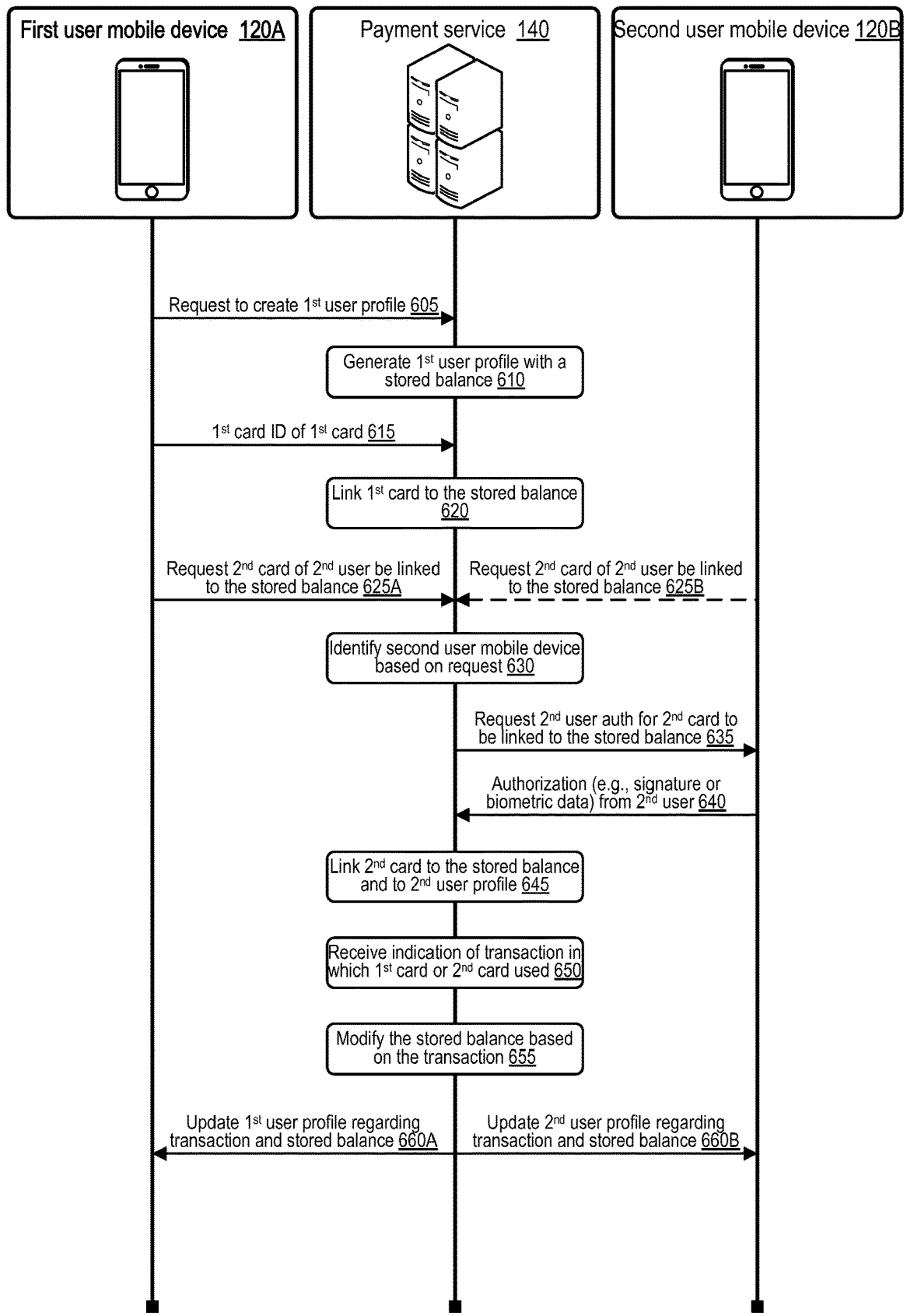
FIG. 6 is a swim lane flow diagram illustrating operations for linking different transaction cards associated with different user profiles to a single stored balance.

FIG. 6 is a swim lane flow diagram illustrating operations for linking different transaction cards associated with different user profiles to a single stored balance.

At step 605, the first user mobile device 120A sends a request to create a first user profile 210A to the payment service 140. At step 610, the payment service 140 generates the first user profile 210A with a stored balance 590.

At step 615, the first user mobile device 120A sends a card identifier of a first card 110A to the payment service 140, confirming that a first user 125A associated with the first user mobile device 120A is in possession of the first card 110A. At step 620, the payment service 140 links the first card 110A to the stored balance and to the first user profile 210A.

Note that while steps 605 through 620 represent the order of the first flow discussed with respect to FIG. 1, steps 615 and 620 may be moved to be before steps 605 and 610 in order to change this to the second flow discussed with respect to FIG. 1.

At step 625A, the first mobile device 120A sends a request to the payment service 140 that a second card 110B of a second user 125B be linked to the stored balance 590. At optional step 625B, the second mobile device 120B may alternatively (or additionally) send a request to the payment service 140 that a second card 110B of a second user 125B be linked to the stored balance 590.

At step 630, the payment service 140 identifies the second user mobile device 120B based on the request of step 625A or 625B. At step 635, the payment service 140 sends a request for authorization for the second card 110B to the linked to the stored balance 590 to the second user mobile device 120B, which may result in an interface 505 like the one in FIG. 5. At step 640, the second user mobile device 120B replies by sending authorization for the second card 110B to the linked to the stored balance 590, optionally by providing a signature of the second user 125B, or biometric measurements of the second user 125B, or otherwise providing authorization through an interface 505 like the one in FIG. 5.

At step 645, the payment service 140 links the second card 110B to the stored balance 590 and to the second user profile 210B at the payment service 140, if the second user profile 210B exists.

At step 650, the payment service 140 receives an indication of a transaction in which a linked card 110 linked to the stored balance 590 is used, where the linked card 110 is either the first card 110A or the second card 110B (or optionally a third card 110C not discussed in FIG. 6). This indication of the transaction may be received from the payment service 140 by a merchant POS device 135 at which the transaction is processed, from one or more financial institutions 160, from the first user mobile device 120A, or from the second user mobile device 120B. At step 655, the payment service 140 modifies the stored balance based on the transaction, for example by subtracting a transaction amount from the stored balance.

At step 660A, the payment service 140 sends an update regarding the transaction of steps 650 and 655 and the modification to the stored balance of step 655 to the first user mobile device 120A, where the first user mobile device 120A can track the balance 590 and view this transaction along with other transactions 580, for example via an interface 530 like the one of FIG. 5. At step 660B, the payment service 140 sends an update regarding the transaction of steps 650 and 655 and the modification to the stored balance of step 655 to the second user mobile device 120B, where the second user mobile device 120B can track the balance 590 and view this transaction along with other transactions 580, for example via an interface 530 like the one of FIG. 5.

FIG. 7 illustrates an exemplary computing system 700 that may be used to implement some aspects of the subject technology. For example, any of the computing devices, computing systems, network devices, network systems, servers, and/or arrangements of circuitry described herein (including but not limited to the mobile device 120, the merchant POS device 130, each server of the payment service 140, each server of the one or more financial institutions 160, any circuitry within or on the trackable card 110, and/or any circuitry within or on the packaging 115) may include at least one computing system 700, or may include at least one component of the computer system 700 identified in FIG. 7. The computing system 700 of FIG. 7 includes one or more processors 710 and memory 720. Each of the processor(s) 710 may refer to one or more processors, controllers, microcontrollers, central processing units (CPUs), graphics processing units (GPUs), arithmetic logic units (ALUs), accelerated processing units (APUs), digital signal processors (DSPs), application specific integrated circuits (ASICs), field-programmable gate arrays (FPGAs), or combinations thereof. Each of the processor(s) 710 may include one or more cores, either integrated onto a single chip or spread across multiple chips connected or coupled together. Memory 720 stores, in part, instructions and data for execution by processor 710. Memory 720 can store the executable code when in operation. The system 700 of FIG. 7 further includes a mass storage device 730, portable storage medium drive(s) 740, output devices 750, user input devices 760, a graphics display 770, and peripheral devices 780.

The components shown in FIG. 7 are depicted as being connected via a single bus 790. However, the components may be connected through one or more data transport means. For example, processor unit 710 and memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing some aspects of the subject technology for purposes of loading that software into memory 720.

Portable storage device 740 operates in conjunction with a portable non-volatile storage medium, such as a floppy disk, compact disk or Digital video disc, to input and output data and code to and from the computer system 700 of FIG. 7. The system software for implementing aspects of the subject technology may be stored on such a portable medium and input to the computer system 700 via the portable storage device 740.

The memory 720, mass storage device 730, or portable storage 740 may in some cases store sensitive information, such as transaction information, health information, or cryptographic keys, and may in some cases encrypt or decrypt such information with the aid of the processor 710. The memory 720, mass storage device 730, or portable storage 740 may in some cases store, at least in part, instructions, executable code, or other data for execution or processing by the processor 710.

Output devices 750 may include, for example, communication circuitry for outputting data through wired or wireless means, display circuitry for displaying data via a display screen, audio circuitry for outputting audio via headphones or a speaker, printer circuitry for printing data via a printer, or some combination thereof. The display screen may be any type of display discussed with respect to the display system 770. The printer may be inkjet, laserjet, thermal, or some combination thereof. In some cases, the output device circuitry 750 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Output devices 750 may include any ports, plugs, antennae, wired or wireless transmitters, wired or wireless transceivers, or any other components necessary for or usable to implement the communication types listed above, such as cellular Subscriber Identity Module (SIM) cards.

Input devices 760 may include circuitry providing a portion of a user interface. Input devices 760 may include an alpha-numeric keypad, such as a keyboard, for inputting alpha-numeric and other information, or a pointing device, such as a mouse, a trackball, stylus, or cursor direction keys. Input devices 760 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a wired local area network (LAN) port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, 802.11 Wi-Fi wireless signal transfer, wireless local area network (WAN) signal transfer, cellular data network wireless signal transfer, personal area network (PAN) signal transfer, wide area network (WAN) signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Input devices 760 may include any ports, plugs, antennae, wired or wireless receivers, wired or wireless transceivers, or any other components necessary for or usable to implement the communication types listed above, such as cellular SIM cards.

Input devices 760 may include receivers or transceivers used for positioning of the computing system 700 as well. These may include any of the wired or wireless signal receivers or transceivers. For example, a location of the computing system 700 can be determined based on signal strength of signals as received at the computing system 700 from three cellular network towers, a process known as cellular triangulation. Fewer than three cellular network towers can also be used—even one can be used—though the location determined from such data will be less precise (e.g., somewhere within a particular circle for one tower, somewhere along a line or within a relatively small area for two towers) than via triangulation. More than three cellular network towers can also be used, further enhancing the location's accuracy. Similar positioning operations can be performed using proximity beacons, which might use short-range wireless signals such as BLUETOOTH® wireless signals, BLUETOOTH® low energy (BLE) wireless signals, IBEACON® wireless signals, personal area network (PAN) signals, microwave signals, radio wave signals, or other signals discussed above. Similar positioning operations can be performed using wired local area networks (LAN) or wireless local area networks (WLAN) where locations are known of one or more network devices in communication with the computing system 700 such as a router, modem, switch, hub, bridge, gateway, or repeater. These may also include Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. Input devices 760 may include receivers or transceivers corresponding to one or more of these GNSS systems.

Display system 770 may include a liquid crystal display (LCD), a plasma display, an organic light-emitting diode (OLED) display, an electronic ink or "e-paper" display, a projector-based display, a holographic display, or another suitable display device. Display system 770 receives textual and graphical information, and processes the information for output to the display device. The display system 770 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 780 may include any type of computer support device to add additional functionality to the computer system. For example, peripheral device(s) 780 may include one or more additional output devices of any of the types discussed with respect to output device 750, one or more additional input devices of any of the types discussed with respect to input device 760, one or more additional display systems of any of the types discussed with respect to display system 770, one or more memories or mass storage devices or portable storage devices of any of the types discussed with respect to memory 720 or mass storage 730 or portable storage 740, a modem, a router, an antenna, a wired or wireless transceiver, a printer, a bar code scanner, a quick-response ("QR") code scanner, a magnetic stripe card reader, a integrated circuit chip (ICC) card reader such as a smartcard reader or a EUROPAY®-MASTERCARD®-VISA® (EMV) chip card reader, a near field communication (NFC) reader, a document/image scanner, a visible light camera, a thermal/infrared camera, an ultraviolet-sensitive camera, a night vision camera, a light sensor, a phototransistor, a photoresistor, a thermometer, a thermistor, a battery, a power source, a proximity sensor, a laser rangefinder, a sonar transceiver, a radar transceiver, a lidar transceiver, a network device, a motor, an actuator, a pump, a conveyer belt, a robotic arm, a rotor, a drill, a chemical assay device, or some combination thereof.

The components contained in the computer system 700 of FIG. 7 can include those typically found in computer systems that may be suitable for use with some aspects of the subject technology and represent a broad category of such computer components that are well known in the art. That said, the computer system 700 of FIG. 7 can be customized and specialized for the purposes discussed herein and to carry out the various operations discussed herein, with specialized hardware components, specialized arrangements of hardware components, and/or specialized software. Thus, the computer system 700 of FIG. 7 can be a personal computer, a hand held computing device, a telephone ("smartphone" or otherwise), a mobile computing device, a workstation, a server (on a server rack or otherwise), a minicomputer, a mainframe computer, a tablet computing device, a wearable device (such as a watch, a ring, a pair of glasses, or another type of jewelry or clothing or accessory), a video game console (portable or otherwise), an e-book reader, a media player device (portable or otherwise), a vehicle-based computer, another type of computing device, or some combination thereof. The computer system 700 may in some cases be a virtual computer system executed by another computer system. The computer can also include different bus configurations, networked platforms, multi-processor platforms, etc. Various operating systems can be used including Unix®, Linux®, FreeBSD®, FreeNAS®, pfSense®, Windows®, Apple® Macintosh OS® ("MacOS®"), Palm OS®, Google® Android®, Google® Chrome OS®, Chromium® OS®, OPENSTEP®, XNU®, Darwin®, Apple® iOS®, Apple® tvOS®, Apple® watchOS®, Apple® audioOS®, Amazon® Fire OS®, Amazon® Kindle OS®, variants of any of these, other suitable operating systems, or combinations thereof. The computer system 700 may also use a Basic Input/Output System (BIOS) or Unified Extensible Firmware Interface (UEFI) as a layer upon which the operating system(s) are run.

In some cases, the computer system 700 may be part of a multi-computer system that uses multiple computer systems 700, each for one or more specific tasks or purposes. For example, the multi-computer system may include multiple computer systems 700 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 700 from different networks communicatively coupled together via the internet (also known as a "distributed" system).

Some aspects of the subject technology may be implemented in an application that may be operable using a variety of devices. Non-transitory computer-readable storage media refer to any medium or media that participate in providing instructions to a central processing unit (CPU) for execution and that may be used in the memory 720, the mass storage 730, the portable storage 740, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L7), resistive random-access memory (RRAM/ReRAM), phase change memory (PCM), spin transfer torque RAM (STT-RAM), another memory chip or cartridge, or a combination thereof.

Various forms of transmission media may be involved in carrying one or more sequences of one or more instructions to a processor 710 for execution. A bus 790 carries the data to system RAM or another memory 720, from which a processor 710 retrieves and executes the instructions. The instructions received by system RAM or another memory 720 can optionally be stored on a fixed disk (mass storage device 730/portable storage 740) either before or after execution by processor 710. Various forms of storage may likewise be implemented as well as the necessary network interfaces and network topologies to implement the same.

While various flow diagrams provided and described above may show a particular order of operations performed by some embodiments of the subject technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a machine, mechanism, and/or computing system 700 discussed herein, and may be performed automatically (e.g., in response to one or more triggers/conditions described herein), autonomously, semi-autonomously (e.g., based on received instructions), or a combination thereof. Furthermore, any action described herein as occurring in response to one or more particular triggers/conditions should be understood to optionally occur automatically response to the one or more particular triggers/conditions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The invention claimed is:

1. A method for managing multiple transaction cards associated with a payment service, the method comprising:
    receiving, at a server, a first card identifier associated with a first transaction card associated with a first user;
    receiving, at the server, a second card identifier associated with a second transaction card associated with a second user from a second mobile device associated with the second user based on the second mobile device reading the second card identifier from the second transaction card;
    linking, within a data structure by the server, the first transaction card with the first user and with a stored balance associated with an account in response to receipt of the first card identifier;
    requesting an authorization regarding linking the second transaction card from the second mobile device associated with the second user and by the server;
    receiving the authorization regarding linking the second transaction card at the server and from the second mobile device associated with the second user, wherein the authorization is based on a user identifier that is unique to the second user and that is input to the second mobile device by the second user;
    linking, within the data structure by the server, the second transaction card with the second user and with the stored balance associated with the account and with a rule regarding access to the stored balance through the second transaction card in response to receipt of the second card identifier and in response to receipt of the authorization from the second mobile device associated with the second user, wherein the rule identifies a maximum total spending amount per a specified period of time;
    authorizing, by the server, processing of a first transaction using the stored balance automatically based on use of the first transaction card;
    modifying, by the server, the stored balance associated with the account in response to authorizing processing of the first transaction;
    authorizing, by the server, processing of a second transaction using the stored balance automatically based on use of the second transaction card and contingent on the rule;
    modifying, by the server, the stored balance associated with the account in response to authorizing processing of the second transaction;
    receiving an indication of a requested third transaction involving use of the second transaction card, the requested third transaction set to exceed the maximum total spending amount per the specified period of time; and
    prohibiting access to the stored balance through the second transaction card for the requested third transaction based on the requested third transaction being set to exceed the maximum total spending amount per the specified period of time.

2. The method of claim 1, wherein the rule identifies a specified transaction type, and wherein prohibiting access to the stored balance through the second transaction card for the requested third transaction is also based on whether a transaction type of the requested third transaction matches the specified transaction type identified by the rule.

3. The method of claim 1, wherein the rule identifies a maximum amount per transaction, and wherein prohibiting access to the stored balance through the second transaction card for the requested third transaction is also based on the requested third transaction being set to exceed the maximum amount per transaction.

4. The method of claim 1, wherein the rule identifies a maximum number of transactions, and wherein prohibiting access to the stored balance through the second transaction card for the requested third transaction is also based on the requested third transaction being set to exceed the maximum number of transactions.

5. The method of claim 1, further comprising:
    linking the first transaction card with a first user profile within the data structure, the first user profile associated with the stored balance and the account; and
    linking the second transaction card with a second user profile within the data structure in response to receipt of authorization from a second mobile device associated with the second user profile.

6. The method of claim 1, wherein the authorization includes a verification of a measurement from a biometric sensor of the second mobile device.

7. The method of claim 1, further comprising:
    linking the first transaction card with a first user profile within the data structure, the first user profile associated with the stored balance; and
    linking the second transaction card with the first user profile within the data structure.

8. The method of claim 1, further comprising:
    receiving, from a first mobile device associated with a first user, a request to create a first user profile with the payment service;
    generating the first user profile associated with the stored balance and the account in response to receipt of the request to create the first user profile;
    storing the first user profile within the data structure; and linking the first user profile to at least one of the first transaction card and the second transaction card within the data structure.

9. The method of claim 1, wherein the first card identifier and the second card identifier are unique.

10. The method of claim 1, wherein the authorization includes a signature input via a touch-sensitive pad of the second mobile device.

11. The method of claim 1, wherein the first transaction card and the second transaction card are linked to different rules regarding access to the stored balance.

12. The method of claim 1, wherein the rule identifies a specified merchant, and wherein prohibiting access to the stored balance through the second transaction card for the requested third transaction is also based on whether a merchant corresponding to the requested third transaction matches the specified merchant identified by the rule.

13. A system implementing a payment service that includes one or more servers, the system comprising:
one or more network communication transceivers that:
receive a first card identifier associated with a first transaction card associated with a first user from a first mobile device associated with the first user, and
receive a second card identifier associated with a second transaction card associated with a second user from a second mobile device associated with the second user based on the second mobile device reading the second card identifier from the second transaction card;
one or more memory units storing instructions; and
one or more processors, wherein execution of the instructions by the one or more processors cause the one or more processors to:
link, within a data structure, the first transaction card with the first user and with a stored balance associated with an account in response to receipt of the first card identifier,
request an authorization regarding linking the second transaction card from the second mobile device associated with the second user,
receive the authorization regarding linking the second transaction card from the second mobile device associated with the second user, wherein the authorization is based on a user identifier that is unique to the second user and that is input to the second mobile device by the second user,
link, within the data structure, the second transaction card with the second user and with the stored balance associated with the account and with a rule regarding access to the stored balance through the second transaction card in response to receipt of the second card identifier and in response to receipt of the authorization from the second mobile device associated with the second user, wherein the rule identifies a maximum total spending amount per a specified period of time,
authorize processing of a first transaction using the stored balance automatically based on use of the first transaction card,
modify the stored balance associated with the account in response to authorizing processing of the first transaction,
authorize processing of a second transaction using the stored balance automatically based on use of the second transaction card and contingent on the rule,
modify the stored balance associated with the account in response to authorizing processing of the second transaction, and
prohibiting access to the stored balance through the second transaction card after the second transaction based on the maximum total spending amount per the specified period of time.

14. The system of claim 13, wherein the one or more network communication transceivers also receive an indication of a requested third transaction involving use of the second transaction card, wherein the rule identifies a specified transaction type, and wherein execution of the instructions by the one or more processors cause the one or more processors to prohibit access to the stored balance through the second transaction card for the requested third transaction based on whether a transaction type of the requested third transaction matches the specified transaction type identified by the rule.

15. The system of claim 13, wherein execution of the instructions by the one or more processors cause the one or more processors to prohibit access to the stored balance via the second transaction card until permission is received from the first mobile device.

16. The system of claim 13, wherein the rule identifies specified transaction type, wherein execution of the instructions by the one or more processors cause the one or more processors to permit access to the stored balance for a transaction based on whether a transaction type of the transaction matches the specified transaction type identified by the rule, wherein the transaction is one of the first transaction and the second transaction.

17. The system of claim 13, wherein the authorization includes a verification of a measurement from a biometric sensor of the second mobile device.

18. The system of claim 13, wherein execution of the instructions by the one or more processors cause the one or more processors to:
link the first transaction card with a first user profile within the data structure, the first user profile associated with the stored balance and the account, and
link the second transaction card with the first user profile within the data structure.

19. The system of claim 13, wherein execution of the instructions by the one or more processors cause the one or more processors to:
receive, from a first mobile device associated with a first user, a request to create a first user profile with the payment service;
generate the first user profile associated with the stored balance in response to receipt of the request to create the first user profile;
store the first user profile within the data structure; and
link the first user profile to at least one of the first transaction card and the second transaction card within the data structure.

20. A non-transitory computer readable storage medium having embodied thereon a program, wherein the program is executable by a processor to perform a method for managing multiple transaction cards associated with a payment service, the method comprising:
receiving a first card identifier associated with a first transaction card associated with a first user;
receiving a second card identifier associated with a second transaction card associated with a second user from a second mobile device associated with the second user based on the second mobile device reading the second card identifier from the second transaction card;

linking, within a data structure, the first transaction card with the first user and with a stored balance associated with an account in response to receipt of the first card identifier;

requesting an authorization regarding linking the second transaction card from the second mobile device associated with the second user;

receiving the authorization regarding linking the second transaction card from the second mobile device associated with the second user, wherein the authorization is based on a user identifier that is unique to the second user and that is input to the second mobile device by the second user;

linking, within the data structure, the second transaction card with the second user and with the stored balance associated with the account and with a rule regarding access to the stored balance through the second transaction card in response to receipt of the second card identifier and in response to receipt of the authorization from the second mobile device associated with the second user, wherein the rule identifies a maximum total spending amount per a specified period of time;

authorizing processing of a first transaction using the stored balance automatically based on use of the first transaction card;

modifying the stored balance associated with the account in response to authorizing processing of the first transaction;

authorizing processing of a second transaction using the stored balance automatically based on use of the second transaction card and contingent on the rule;

modifying the stored balance associated with the account in response to authorizing processing of the second transaction; and prohibiting access to the stored balance through the second transaction card after the second transaction based on the maximum total spending amount per the specified period of time.

\* \* \* \* \*